United States Patent
Shinn et al.

(10) Patent No.: US 7,702,957 B2
(45) Date of Patent: Apr. 20, 2010

(54) SYSTEMS AND METHODS FOR TIMER SERVICE

(75) Inventors: Matthew Shinn, San Francisco, CA (US); Seth White, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 945 days.

(21) Appl. No.: 11/003,033

(22) Filed: Dec. 3, 2004

(65) Prior Publication Data

US 2005/0273674 A1      Dec. 8, 2005

Related U.S. Application Data

(60) Provisional application No. 60/573,207, filed on May 21, 2004.

(51) Int. Cl.
  *G06F 17/30* (2006.01)
  *G06F 11/00* (2006.01)

(52) U.S. Cl. .............................. 714/38; 707/10; 714/47; 714/48; 714/55

(58) Field of Classification Search .................. 707/10; 714/38, 47, 48, 55
See application file for complete search history.

(56) References Cited

U.S. PATENT DOCUMENTS

| 6,012,090 A * | 1/2000 | Chung et al. ................. 709/219 |
| 6,574,770 B1 * | 6/2003 | Daudelin ..................... 714/776 |
| 6,807,547 B2 * | 10/2004 | Matena et al. ........... 707/103 R |
| 2003/0051236 A1 * | 3/2003 | Pace et al. .................... 717/177 |
| 2005/0188277 A1 * | 8/2005 | Tayler et al. .................. 714/39 |

* cited by examiner

*Primary Examiner*—Robert Beausoliel
*Assistant Examiner*—Jeison C Arcos
(74) *Attorney, Agent, or Firm*—Fliesler Meyer LLP

(57) ABSTRACT

The present invention supports container-provided EJB timer service that allows EJB instances dealing with timed events to create and register for a timer, which is scheduled to send notifications either at a specific time and/or after a specific elapsed duration, or at specific recurring intervals. When the timer expires, certain business logic inside the EJB instance will be invoked to handle the timeout event. When the cancel method of a timer is called, the timer may cease to exist. The timer is capable of retrying failed timeout under certain conditions when the current invocation of timeout logic fails. In addition, the timer is capable of monitoring the access from multiple registered EJB instances enrolled in transactions under multi-threaded environment, and restricting the access to the timer from EJB instances in certain threads until the current transaction accessing the timer commits to prevent a potential conflicting situation. This description is not intended to be a complete description of, or limit the scope of, the invention. Other features, aspects, and objects of the invention can be obtained from a review of the specification, the figures, and the claims.

21 Claims, 5 Drawing Sheets

```
public interface weblogic.management.runtime.EJBTimerRuntimeMBean { public int getTimeoutCount();              401 public int getActiveTimerCount();          402 public int getCancelledTimerCount();       403 public int getDisabledTimerCount();        404 public void activateDisabledTimers();      405

```
public final interface WLTimerInfo { public static int REMOVE_TIMER_ACTION  = 1;      501
    public static int DISABLE_TIMER_ACTION = 2;      502
    public static int SKIP_TIMEOUT_ACTION  = 3;      503 public void setMaxRetryAttempts(int retries);    504
    public int getMaxRetryAttempts();

public void setRetryDelay(long millis);          505
    public long getRetryDelay();

public void setMaxTimeouts(int max);             506
    public int getMaxTimeouts();

public void setTimeoutFailureAction(int action); 507
    public int getTimeoutFailureAction();

} public interface WLTimer extends Timer { public int getRetryAttemptCount();

public int getMaximumRetryAttempts();

public int getCompletedTimeoutCount();

SYSTEMS AND METHODS FOR TIMER SERVICE

CLAIM OF PRIORITY

This application claims priority from the following applications, which are hereby incorporated by reference in their entireties:

U.S. Provisional Patent Application No. 60/573,207, entitled SYSTEM AND METHOD FOR TIMER SERVICE by Matthew Shinn et al., filed May 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of EJB services.

BACKGROUND

Enterprise applications that model workflow-type business processes are dependent on notifications that certain temporal events have occurred in order to manage the semantic state transitions that are intrinsic to the business processes that they model. To fit this need, timer service for a programmable class can be added to and managed by a container to provide a reliable and transactional notification service for timed events. Here a programmable class (also referred to as class) can be but is not limited to, a Java bean, an Enterprise Java Bean (EJB), an interface, a module, and other suitable concepts, and EJB will be used to illustrate the various embodiments of the invention in the following context. One scenario of when the timer service may be used is to send out a notification when an EJB instance remains in a certain state for an elapsed amount of time. For example, an EJB instance representing an expense report that needs to be approved by a manager should be registered with a timer when it is created so that when the timer expires, the certain business logic handling timeout in the EJB instance is called back upon to email the manager and the employee that the expense report is still waiting for approval. If the expense report is approved before the reminder timer expires, the timer could be cancelled.

A timeout failure occurs when the business logic handling timeout event fails. Under such circumstance, the failed timeout logic should be retried for a number of times before an exception is thrown in order to minimize the impact of the timeout failure. However, the mechanism to support such retry feature is not currently provided by many timer service systems.

In addition, since a timer is typically created by an EJB instance within the scope of a transaction and can be associated with other EJB instances, such as instances of stateless session beans or message driven beans, it is possible that the timer may be accessed by multiple transactions under a multi-threaded environment. Many current timer service systems cannot adequately control the concurrent access to the timer, which often causes the mal-operation or failure of certain threads involved.

BRIEF DESCRIPTION OF THE DRAWINGS

FIG. 4 illustrates an exemplary code of EJBTimerRuntimeMBean in accordance with one embodiment of the invention.

FIG. 5 illustrates exemplary codes of WLTimerInfo and WLTimer in accordance with one embodiment of the invention.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of the present invention support container-provided EJB timer service that allows EJB instances dealing with timed events to create and register for a timer, which is scheduled to send notifications either at a specific time and/or after a specific elapsed duration, or at specific recurring intervals. When the timer expires, certain business logic inside the EJB instance will be invoked to handle the timeout event. When the cancel method of a timer is called, the timer may cease to exist. The timer is capable of retrying failed timeout under certain conditions when the current invocation of timeout logic fails. In addition, the timer is capable of monitoring the access from multiple registered EJB instances enrolled in transactions under multi-threaded environment, and restricting the access to the timer from EJB instances in certain threads until the current transaction accessing the timer commits in order to prevent potential conflicting situations.

Figure 1:
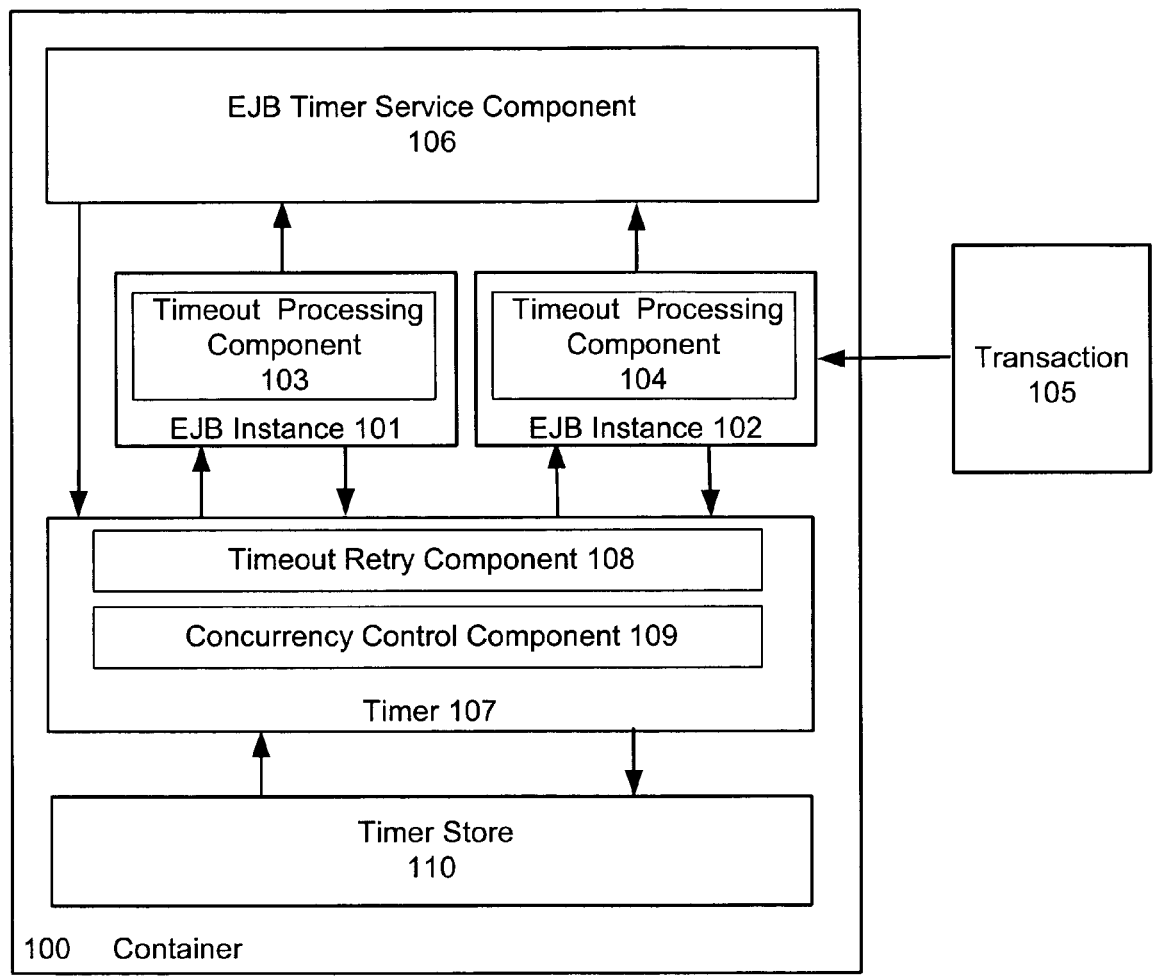
FIG. 1 is an illustration of an exemplary system to support timer service in accordance with one embodiment of the present invention.

FIG. 1 is an illustration of an exemplary system to support timer service in accordance with one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Figure 2:
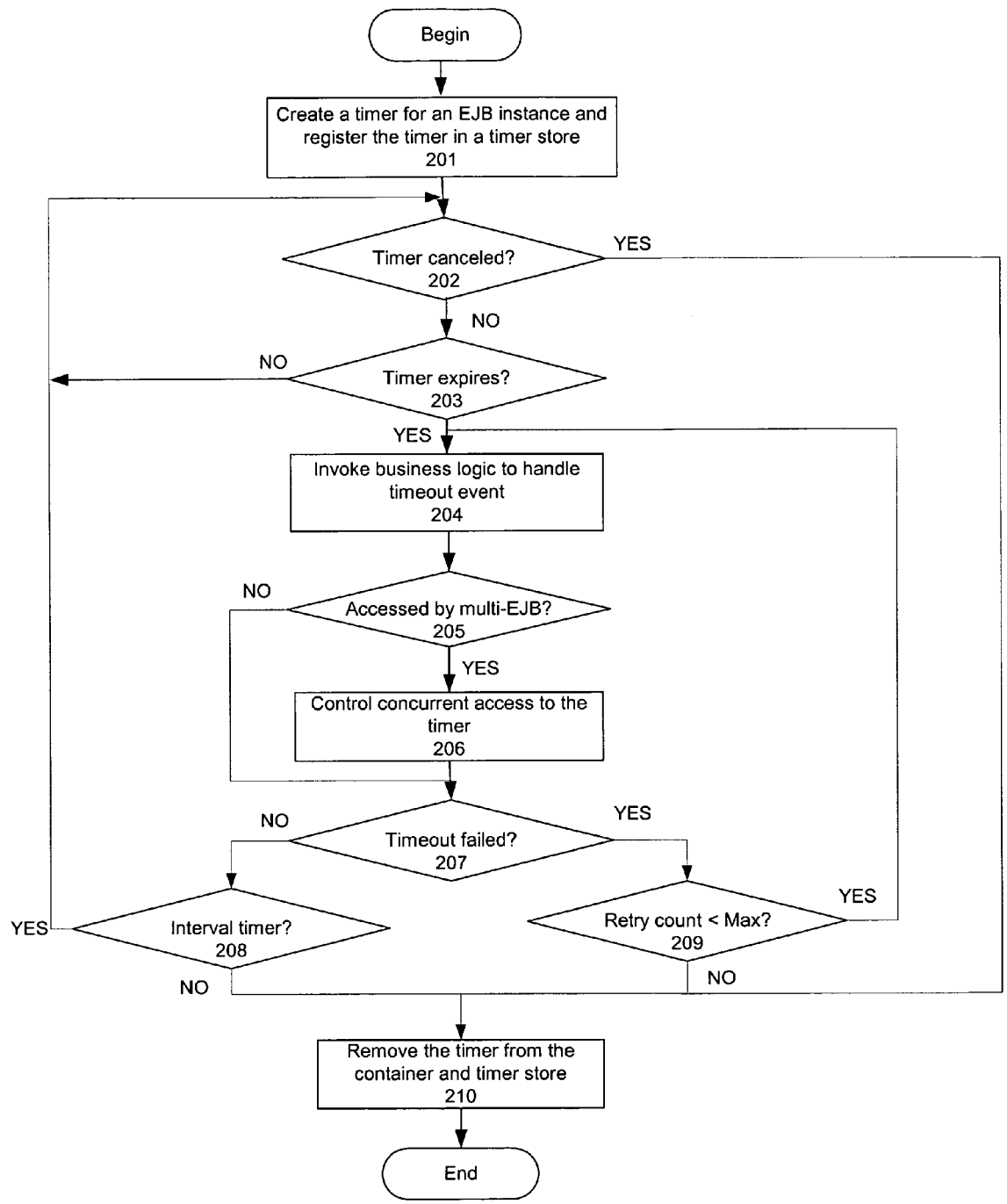
FIG. 2 is a flow chart illustrating an exemplary timer service process in accordance with one embodiment of the invention.

Referring to FIG. 1, EJB instances 101 and 102 reside in a container 100, where an EJB instance such as 102 may be enrolled in a transaction 105 of a thread in a multi-threaded computing environment. Each EJB instance may include a timeout processing component 103 or 104, which contains the business logic to handle a timeout event. An EJB timer service component 106 may create a timer 107 and register it with an EJB instance requesting timer service. Each timer will be registered with a persistent timer store 110 so that it will survive (persist) in case the container and/or the application server the container runs on crashes, or the EJB instance(s) it is registered with are activated or passivated. A timer may further include a timeout retry component 108 capable of retrying the timeout processing component under certain conditions if the first invocation of the component fails. The timer may also include a concurrency control component 109 capable of managing the access to the timer by registered EJB instances from multiple threads and/or transactions depending on the current state of the timer. 100171 FIG. 2 is a flow chart illustrating an exemplary timer service process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a timer is created and persisted in a timer store for an EJB instance requesting timer service at step 201. If the timer is canceled at step 202, it will be removed from the container as well as the store at step 210. If the timer expires at step 203, business logic in the EJB instance will be invoked to handle the timeout event at step 204. If the timer is accessed concurrently by multiple EJB instances at step 205, concurrent access to the timer will be controlled depending on the state of the timer at step 206. If the timeout process failed at step 207, and it is determined at step 209 that the timer has been retried less than a specified maximum retry count, the timeout logic will be retried again starting from step 204. Otherwise, the timer will be removed at step 210 and an exception will be thrown. If the timeout completes successfully, it will be reset to serve the EJB instance again until the next expiration at step 202 if it is an interval timer (step 208); otherwise, it will be removed at step 210.

In some embodiments, the timer service will be initialized when an EJB instance is deployed in a container on a running server. For EJB instances deployed during the server startup, the timer service will not be initialized until the server has finished booting (listening on its ports). An EJB timer service, such as the EJBTimerManager component, will be created for each container to access the persistent timer store, iterate over its contents and register timers with it. For a server still booting, the registration will not occur and no timeout callbacks to registered EJB instances will be made until the server has finished booting.

In some embodiments, an EJB instance can request and access the timer service through one of its interfaces, such as EJBContext. The timer service provides methods for the creation and cancellation of timers, as well as for locating the timers that are associated with the EJB instance, wherein a timer is created to schedule timeout callbacks that invoke business logics in the EJB instance.

In some embodiments, the timer creation methods in the timer service allow a timer to be created as a single-event (non-interval) timer or as an interval timer. The timer expiration (initial expiration in the case of an interval timer) may be expressed either in terms of a duration or as an absolute time. The EJB instance may pass some client-specific information at the time the timer is created to help it recognize the significance of the expiration of the timer. This information, which is serializable, is stored by the timer service and available through the timer. The timer service must begin to count down the timer duration upon the creation of the timer.

In some embodiments, the EJB instances using the timer service may implement a timeout processing component, such as the javax.ejb.TimedObject interface, which includes the business logics to handle timeout events. This interface has a single method, the timeout callback method, such as ejbTimeout. When the timer expires (i.e., after the number of milliseconds specified at its creation expires or after the absolute time specified has passed), it will send a timeout notification and the ejbTimeout method of the instance registered for the timer will be invoked. The getInfo method in the timer can be used to retrieve the information that was supplied when the timer was created. This information may be useful in enabling the EJB instance to recognize the significance of the timer expiration.

In some embodiments, the ejbTimeout method has no client security context since it is an internal method of the EJB class. Elements in a deployment descriptor of the EJB can be used to specify a security identity to be used for the invocation of methods from within the ejbTimeout method. If container-managed transaction demarcation is used and the RequiresNew transaction attribute is specified in the deployment descriptor, the container must begin a new transaction prior to invoking the ejbTimeout method. If the transaction fails or is rolled back, the container must retry the timeout at least once.

In some embodiments, a single-action timer is removed from the container after its ejbTimeout method has been successfully invoked (e.g., when the transaction that has been started for the invocation of the ejbTimeout method commits). If an EJB instance invokes the single-action timer after the termination of its ejbTimeout method, a NoSuchObjectLocalException is thrown. If an entity bean instance is removed, the container must remove the timers for that bean instance. When an EJB instance is un-deployed, all its associated timers will be removed from both the underlying container and the timer store.

In some embodiments, a timer may be cancelled by the EJB instance using its own cancel method before its expiration. If a timer is cancelled, the ejbTimeout method will not be called. When the cancel method of a timer is called, the timer will be removed from the container and its timer store. If a method is subsequently invoked on the timer, the container may throw an exception, such as javax.ejb.NoSuchObjectLocalException.

In some embodiments, the container interleaves calls to the ejbTimeout method with the calls to the business methods and the life cycle methods (such as ejbLoad, ejbStore, etc.) of the bean. The time at which the ejbTimeout method is called may therefore not correspond exactly to the time specified at timer creation. If multiple timers have been created for an instance and will expire at approximately the same time, the instance must be prepared to handle timeout callbacks that are out of sequence, as well as extraneous calls to the ejbTimeout method in the event that a timer expiration is outstanding when a call to the cancellation method has been made.

In some embodiments, an EJB instance typically creates and/or cancels a timer within the scope of a transaction. If the transaction is then rolled back, an operation on the timer, such as the timer creation, cancellation, update on its attribute(s) is rolled back, respectively. Similarly, the invocations of the methods to create and cancel the timer and its ejbTimeout method are typically made within a transaction. If the transaction in which the timer cancellation occurs is rolled back, the container must restore the duration of the timer to the duration it would have had if it had not been cancelled. If the timer would have expired by the time that the transaction failed, the failure of the transaction should result in the expired timer providing an expiration notification after the transaction rolls back.

Figure 3:
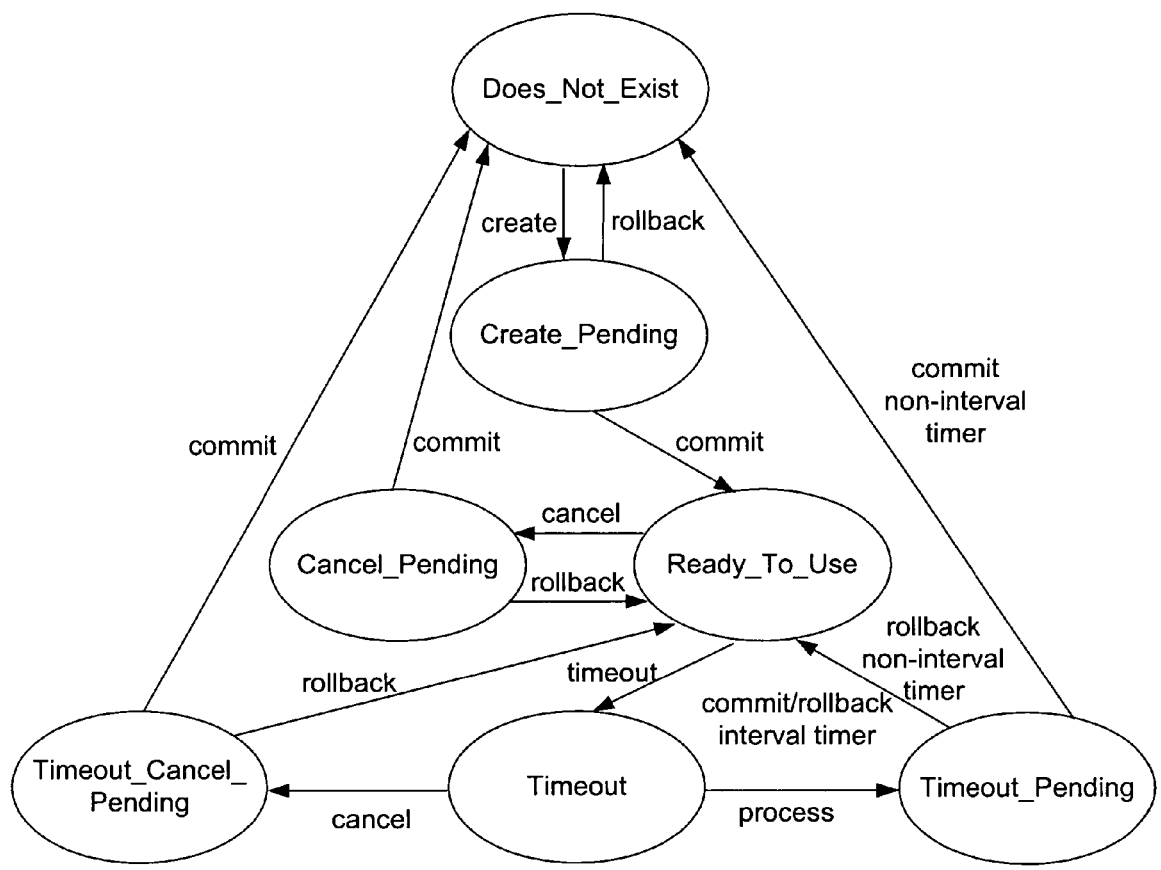
FIG. 3 is a diagram of an exemplary state machine for a timer in accordance with one embodiment of the invention.

FIG. 3 is a diagram of an exemplary state machine of a timer in accordance with one embodiment of the invention. Although this diagram depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, a timer is at the Does_Not_Exist state initially before it is created. It will move to Create_Pending state if an EJB instance requests the timer service to create the timer, typically within the scope of a transaction. The timer may be rolled back to the Does_Not_Exist state if the transaction itself is rolled back. Otherwise, the timer will commit to the Ready_To_Use state and start serving the EJB instance it is registered with.

While in the Ready_To_Use state, the timer may be canceled by the EJB instance it is registered with and enter the Cancel_Pending state. If the transaction the EJB instance is enrolled in is rolled back, the timer cancellation will also be rolled back to the Ready_To_Use state. Otherwise, the cancellation will commit and the timer will be removed. If the timer expires, the ejbTimeout method in the EJB instance will be called and the timer enters the Timeout state.

While in the Timeout state, the timer may move to the Timeout_Pending state when the ejbTimeout method finishes executing the business logic provided to handle the timeout event. The timer may alternatively move to the Timeout_Cancel_Pending state if the ejbTimeout method cancels the timer.

While in the Timeout_Cancel_Pending state, the timer cancellation may be rolled back to the Ready_To_Use state if the transaction the EJB instance is enrolled with is rolled back. Otherwise, the timer cancellation will commit and the timer will move back to the Does_Not_Exist state and be removed.

While in the Timeout_Pending state, the timer may also be rolled back to the Ready_To_Use state if the transaction the EJB instance is enrolled with is rolled back. Otherwise, the timer will either commit to the Ready_To_Use state if it is an interval timer, or commit to the Does_Not_Exist state if it is a single-event timer.

In some embodiments, a timeout failure defined as a failure to invoke the ejbTimeout method may occur due to a rolled back transaction (if ejbTimeout has a transaction attribute of RequiresNew) or if a RuntimeException is thrown out of the ejbTimeout method. When a timeout failure occurs, the default behavior will be to retry the ejbTimeout method until it succeeds. This default behavior can be programmatically overridden via a timeout retry component in the timer during its creation. The timeout retry component can specify various attributes in the timer, such as the maximum number of retry attempts that should be made when a timeout failure occurs, a delay that should occur before redelivery is attempted and what should be done after the maximum number of retry attempts have been exhausted. Choices include permanently removing the timer, temporarily disabling the timer and, for interval timers, skipping the current expiration notice. Temporarily disabling the timer would require a server restart or action from the server administrator to re-enable the timer. It will have the effect of suspending all attempts to invoke the ejbTimeout method on the EJB instance until either the EJB instance is redeployed or an administrator re-enables any disabled timers for the deployment of the EJB instance using a console or an API, such as EJBTimerRuntimeMBean. The instance passed to the ejbTimeout method should also implement interfaces such as weblogic.ejb.WLTimer in addition to the standard timer interface. The WLTimer interface can be used to get additional information about the timer such as the number of successful timeouts for the Timer.

FIG. 4 illustrates an exemplary code of EJBTimerRuntimeMBean in accordance with one embodiment of the invention. As shown, 401 gets the number of successful timeout notifications that have been made. 402 gets the number of active timers in the container. 403 gets the number of timers that have been cancelled in the container. 404 gets the number of timers that are temporarily disabled in the container, and 405 activates any temporarily disabled timers.

FIG. 5 illustrates exemplary codes of WLTimerInfo and WLTimer in accordance with one embodiment of the invention. As shown, the REMOVE_TIMER_ACTION (501), DISABLE_TIMER_ACTION (502), and SKIP_TIMEOUT_ACTION (503) fields of this interface define the possible values of the corresponding actions. 504 sets the maximum number of retry attempts that will be performed for this timer. If all retry attempts are unsuccessful, the timeout failure action will be executed. 505 sets the number of milliseconds that should elapse before any retry attempts are made. 506 sets the maximum number of timeouts that can occur for this timer. After the specified number of timeouts have occurred successfully, the timer will be removed. 507 sets the action the container will take when ejbTimeout and all retry attempts fail.

In some embodiments, timers can be created for stateless session beans, message-driven beans, and entity beans, but not for stateful session beans. A timer that is created for an entity bean instance is associated with the identity of the entity bean instance. On the other hand, a timer that is created for a stateless session bean or a message-driven bean instance may be associated with any such instances in a pool and may invoke the ejbTimeout methods in any of them, making it likely that more than one instance may be registered with, access and/or update the same timer concurrently in a multi-threaded environment.

In some embodiments, the concurrent access to the same timer by multiple threads may have undesired consequences under certain circumstances. Under an exemplary scenario, the ejbTimeout method in EJB instance E1 enrolled in a transaction in thread T1 cancels a timer T, which E1 is registered with. When the transaction later fails to commit and is rolled back, the cancellation of T is rolled back too and T remains intact. During the period between the cancellation of T is called by T1 and its transaction is rolled back, a second EJB instance E2, which is also registered with T and enrolled in another transaction in thread T2 also calls the cancel method on T. Since T is being canceled by E1 at that time, the cancellation action by E2 will fail even though the cancellation by E1 is later rolled back. As an undesired consequence, the rolling back of T1 results in the undesired failure of E2 to cancel T, causing T to remain intact after two consecutive cancellation efforts by E1 and E2.

In some embodiments, a concurrency control component inside the timer can be utilized to control the access from multiple EJB instances under the multi-threaded environment to avoid potential side effects described above. Such concurrency control can be implemented based on the state diagram of the timer shown in FIG. 3. When the timer is at certain states, such as those pending states (Create_Pending, Cancel_Pending, Timeout_Cancel_Pending, Timeout_Pending, etc.), only one EJB instance in one thread will be granted access to the timer at any given time, while EJB instances enrolled in transactions in other threads will have to wait until the timer moves from its current states to other states, such as those committed states, before they can proceed to access the timer. Using the scenario discussed in the proceeding section as an example, the timer is at the Timeout_Cancel_Pending state after E1 enrolled in T1 calls cancellation on the timer. While at this state, the concurrency control component of the timer will block the access by E2 from T2 to access the timer until the timer is rolled back to the Ready_To_Use state. Using such concurrency control, the access and cancellation by E2 may proceed after the access by E1 is finished, and the timer will be canceled after E2 is granted access to the timer and commits its cancel action.

In some embodiments, the timer service is intended for the long-lived business processes where a timer should be a persistent object that is able to survive container crashes and the activation/passivation and load/store cycles of the EJB instance that is registered with the timer. In the event of a container crash, any single-action timer that has expired during the intervening time before the container is restarted must cause the ejbTimeout method to be invoked upon restart, while any interval timer that has expired during the intervening time must cause the ejbTimeout method to be invoked at least once upon restart.

In some embodiments, a time store must be configured to hold timers that must be persistent after creation. The timer store can either be file-based or Java Database Connector (JDBC)-based. It can be configured via a console and its configuration information is persisted in a configuration file such as config.xml in XML file format. Each container running on an application server must have at least one timer store to hold timers created on that container. Each container may have a default timer store such that applications requiring a store for persistence may use the default timer store if the application is not configured to use a specific store. An EJB instance can be configured to access a specific timer store via an attribute at the ejb-jar level in a deployment descriptor such as weblogic-ejb-jar.xml. If an EJB instance is not configured to use a specific timer store, it will use the default store in the container. If an EJB instance is configured to use a specific store and that store is not available when the timer service is initialized, the deployment of the EJB instance will fail.

In some embodiments, when a server crashes or needs to be taken down for a period of time, any timers that are persisted in a timer store on that server may be migrated to another server in the same cluster in order to reduce the number of missed or late timeout callbacks upon timer expiration. Such migration will likely occur either at the server level (migrating the entire server) or the service level (migrating the timer store). The server level migration means that a given server would be shutdown on one machine and started on another. The timer store would be initialized on the new machine and any EJB instances using that store would be able to access the store normally as they are deployed.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "bean" is used in the embodiments of the systems and methods described above, it will be evident that such concept can be interchangeably used with equivalent concepts such as, class, method, type, interface, component, object model, and other suitable concepts. While the concept "instance" is used in the embodiments of the systems and methods described above, it will be evident that such concept can be interchangeably used with equivalent concepts such as, object, and other suitable concepts. While the concept "attribute" is used in the embodiments of the systems and methods described above, it will be evident that such concept can be interchangeably used with equivalent concepts such as, field, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide timer service in a container, comprising:
    a computer including an application server and a container thereon that contains a plurality of objects;
    a timer associated with the container, which provides a timer service to the plurality of objects therein, wherein the timer can be persisted with an internal state in a persistent timer store, and wherein the persistent timer store allows the timer to survive a failure of the container;
    a timer service component stored within the container, which is used to register one or more of the plurality of objects with the timer for a timer service within a scope of a transaction, and wherein each of the one or more of the plurality of objects is associated with a timeout processing component that handles timeout events triggered when the timer expires;
    a concurrency control component stored within the container, which manages concurrent access to the timer, and wherein the concurrency control component is configured to
        associate the timer with a first object of said one or more of the plurality of objects within a scope of a first transaction, and register the first object with the timer for a timer service,
        determine that the timer has expired within the scope of the first transaction, and trigger a timeout event,
        receive a cancellation of the timer from the first object, and block a second object of said one or more of the plurality of objects, which is associated within a scope of a second transaction, from accessing the timer, until the timeout processing component in the first object finishes handling the timeout event, wherein the timer is associated with a state machine, wherein the state machine defines a plurality of internal states that includes a first internal state when the timer is not created, wherein the first internal state is a timer does-not-exist state;

a second internal state when the timer is created and ready to be used, wherein the second internal state is a timer ready-to-be-used state;

a third internal state when the timer expires, wherein the third internal state is a timer timeout state;

the plurality of internal states also include a plurality of pending states, wherein the plurality of pending state includes a timer timeout-cancel-pending state that indicates a cancellation of the timer during a timer timeout state and defines a transition from the timer timeout state to the timer does-not-exist state before the transaction is committed, and the timer timeout-cancel-pending state can be rolled back to the timer ready-to-be-used state once the transaction is canceled;

a timer create-pending state that defines a transition from the timer does-not-exist state to the ready-to-be-used state before the transaction is committed, and the timer create-pending state can be rolled back to the timer does-not-exist state once the transaction is canceled;

a timer cancel-pending state that defines a transition from the timer ready-to-be-used state to the timer does-not-exist state before the transaction is committed, and the timer create-pending state can be rolled back to the timer ready-to-be-used state once the transaction is canceled; and a timer timeout-pending state that indicates that one or more business logic provided to handle a timeout event associated with the timeout state is executed and finished, and the timer timeout-pending state can be rolled back to the timer ready-to-be-used state once the transaction is canceled.

2. The system according to claim 1, wherein:
each one of the plurality of objects can be one of a software object, an interface, and a module.

3. The system according to claim 1, wherein:
the timer can be a single-event timer or an interval timer.

4. The system according to claim 1, wherein:
the timeout processing component is capable of at least one of the following when a specified number of retry attempts are exhausted:
removing the timer;
disabling the timer temporarily; and
skipping the timeout event in the case of an interval timer.

5. The system according to claim 1, wherein:
an attribute of the timer can be one of:
the maximum number of times to retry the timeout processing component when the timeout fails; and
a delay to retry the timeout processing component.

6. The system according to claim 1, wherein:
one of the plurality of objects can be an instance of an entity bean, a stateless session bean or a message driven bean.

7. The system according to claim 1, wherein:
one of the plurality of objects can be enrolled with a transaction in one or more threads under a multi-threaded environment.

8. The system according to claim 1, wherein:
said timer is further capable of at least one of:
maintaining one or more attributes of the timer;
notifying a timeout when it expires; and
retrying up to a specified number of times the business logic in the timeout processing component in the one or more objects associated with the timer when the timeout fails.

9. The system according to claim 1, wherein:
the timer is further capable of
rolling back the first transaction and switching to the timer ready-to-be-used state;
allowing the second object to access the timer within the scope of the second transaction; and
blocking the first object from accessing the timer.

10. The system according to claim 1, wherein:
the persistent timer store is further capable of persisting the timer to survive at least one of:
a crash of the container; and
an activation or passivation of one or more objects registering with the timer.

11. The system according to claim 10, wherein:
the timer store is either file-based or JDBC-based.

12. A method to provide timer service in a container, comprising:
providing a computer including an application server and a container thereon that contains a plurality of objects;
associating a timer with the container, which provides a timer service to the plurality of objects therein, wherein the timer can be persisted with an internal state that allows the timer to survive a failure of the container;
using a timer service component stored within the container to register one or more of the plurality of objects with the timer for a timer service within a scope of a transaction, and wherein each of the one or more of the plurality of objects is associated with a timeout processing component that handles timeout events triggered when the timer expires;
managing concurrent access to the timer, via a concurrency control component stored within the container, and configuring the concurrency control component to
associate the timer with a first object of said one or more of the plurality of objects within a scope of a first transaction, and register the first object with the timer for a timer service,
determine that the timer has expired within the scope of the first transaction, and trigger a timeout event,
receive a cancelation of the timer from the first object, and
block a second object of said one or more of the plurality of objects, which is associated within a scope of a second transaction, from accessing the timer, until the timeout processing component in the first object finishes handling the timeout event; and
associating the timer with a state machine, wherein the state machine defines a plurality of internal states that includes
a first internal state when the timer is not created, wherein the first internal state is a timer does-not-exist state;
a second internal state when the timer is created and ready to be used, wherein the second internal state is a timer ready-to-be-used state;

a third internal state when the timer expires, wherein the third internal state is a timer timeout state;

the plurality of internal states also include a plurality of pending states, wherein the plurality of pending state includes a timer timeout-cancel-pending state that indicates a cancelation of the timer during a timer timeout state and defines a transition from the timer timeout state to the timer does-not-exist state before the transaction is committed, and the timer timeout-cancel-pending state can be rolled back to the timer ready-to-be-used state once the transaction is canceled;

a timer create-pending state that defines a transition from the timer does-not-exist state to the ready-to-be-used state before the transaction is committed, and the timer create-pending state can be rolled back to the timer does-not-exist state once the transaction is canceled;

a timer cancel-pending state that defines a transition from the timer ready-to-be-used state to the timer does-not-exist state before the transaction is committed, and the timer create-pending state can be rolled back to the timer ready-to-be-used state once the transaction is canceled; and a timer timeout-pending state that indicates that one or more business logic provided to handle a timeout event associated with the timeout state is executed and finished, and the timer timeout-pending state can be rolled back to the timer ready-to-be-used state once the transaction is canceled.

13. The method according to claim 12, further comprising:
persisting the timer via the persistent timer store to survive an activation or passivation of one or more instances registering with the timer.

14. The method according to claim 12, further comprising:
performing at least one of the following when the specified number of retry attempts are exhausted:
removing the timer;
disabling the timer temporarily; and
skipping the timeout event in the case of an interval timer.

15. The method according to claim 12, wherein:
an attribute of the timer can be one of:
the maximum number of times to retry the timeout processing component when the timeout fails; and
a delay to retry the timeout processing component.

16. The method according to claim 12, wherein:
one of the plurality of objects can be enrolled with a transaction in one or more threads under a multi-threaded environment.

17. A machine readable medium having instructions stored thereon that when executed cause a system to:
providing a computer including an application server and a container thereon that contains a plurality of objects;
associate a timer with the container, which provides a timer service to the plurality of objects therein, wherein the timer can be persisted with an internal state that allows the timer to survive a failure of the container;
use a timer service component stored within the container to register one or more of the plurality of objects with the timer for a timer service within a scope of a transaction, and wherein each of the one or more of the plurality of objects is associated with a timeout processing component that handles timeout events triggered when the timer expires;

manage concurrent access to the timer, via a concurrency control component stored within the container, and configuring the concurrency control component to
associate the timer with a first object of said one or more of the plurality of objects within a scope of a first transaction, and register the first object with the timer for a timer service,
determine that the timer has expired within the scope of the first transaction, and trigger a timeout event,
receive a cancelation of the timer from the first object, and
block a second object of said one or more of the plurality of objects, which is associated within a scope of a second transaction, from accessing the timer, until the timeout processing component in the first object finishes handling the timeout event
associate the timer with a state machine, wherein the state machine defines a plurality of internal states that includes
a first internal state when the timer is not created, wherein the first internal state is a timer does-not-exist state;
a second internal state when the timer is created and ready to be used, wherein the second internal state is a timer ready-to-be-used state;
a third internal state when the timer expires, wherein the third internal state is a timer timeout state;
the plurality of internal states also include a plurality of pending states, wherein the plurality of pending state includes
a timer timeout-cancel-pending state that indicates a cancelation of the timer during a timer timeout state and defines a transition from the timer timeout state to the timer does-not-exist state before the transaction is committed, and the timer timeout-cancel-pending state can be rolled back to the timer ready-to-be-used state once the transaction is canceled;
a timer create-pending state that defines a transition from the timer does-not-exist state to the ready-to-be-used state before the transaction is committed, and the timer create-pending state can be rolled back to the timer does-not-exist state once the transaction is canceled;
a timer cancel-pending state that defines a transition from the timer ready-to-be-used state to the timer does-not-exist state before the transaction is committed, and the timer create-pending state can be rolled back to the timer ready-to-be-used state once the transaction is canceled; and
a timer timeout-pending state that indicates that one or more business logic provided to handle a timeout event associated with the timeout state is executed and finished, and the timer timeout-pending state can be rolled back to the timer ready-to-be-used state once the transaction is canceled.

18. The machine readable medium of claim 17, further comprising instructions that when executed cause the system to:
persist the timer via the persistent timer store to survive an activation or passivation of one or more objects registering with the timer.

19. The machine readable medium of claim 17, further comprising instructions that when executed cause the system to:

perform at least one of the following when a specified number of retry attempts are exhausted:
   removing the timer;
   disabling the timer temporarily; and
   skipping the timeout event in the case of an interval timer.

20. The machine readable medium of claim 17, wherein:
an attribute of the timer can be one of:
   the maximum number of times to retry the timeout processing component when the timeout fails; and
   a delay to retry the timeout processing component.

21. The machine readable medium of claim 17, wherein:
one of the plurality of objects can be enrolled with a transaction in one or more threads under a multi-threaded environment.

* * * * *

UNITED STATES PATENT AND TRADEMARK OFFICE
CERTIFICATE OF CORRECTION

| | | |
|---|---|---|
| PATENT NO. | : 7,702,957 B2 | Page 1 of 1 |
| APPLICATION NO. | : 11/003033 | |
| DATED | : April 20, 2010 | |
| INVENTOR(S) | : Matthew Shinn et al. | |

It is certified that error appears in the above-identified patent and that said Letters Patent is hereby corrected as shown below:

In column 3, line 6-14, delete "100171 FIG. 2 is a flow chart illustrating an exemplary timer service process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways." and insert -- FIG. 2 is a flow chart illustrating an exemplary timer service process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways. -- below "timer." on Col. 3, line 7 as a new paragraph.

In column 6, line 64, delete "Timout" and insert -- Timeout --, therefor.

Signed and Sealed this

Nineteenth Day of April, 2011

David J. Kappos
*Director of the United States Patent and Trademark Office*